Nov. 28, 1939.   H. W. BALL   2,181,778
PHOTOELECTRIC CONTROL FOR TRAVELING CRANES OR THE LIKE
Filed March 14, 1939   6 Sheets-Sheet 1

H. W. Ball
Inventor

By Seymour, Bright & Nottingham
Attorneys

Nov. 28, 1939.                H. W. BALL                2,181,778
           PHOTOELECTRIC CONTROL FOR TRAVELING CRANES OR THE LIKE
                  Filed March 14, 1939        6 Sheets-Sheet 2

Nov. 28, 1939.  H. W. BALL  2,181,778
PHOTOELECTRIC CONTROL FOR TRAVELING CRANES OR THE LIKE
Filed March 14, 1939  6 Sheets-Sheet 3

Fig. 6.

A.-C. Supply.

Fig. 7.

D.-C. Supply.

Patented Nov. 28, 1939

2,181,778

UNITED STATES PATENT OFFICE 2,181,778

PHOTOELECTRIC CONTROL FOR TRAVEL-
ING CRANES OR THE LIKE

Harvey W. Ball, Alliance, Ohio, assignor to The
Morgan Engineering Company, Alliance, Ohio Application March 14, 1939, Serial No. 261,859

6 Claims. (Cl. 212—21)

The present invention relates to a photoelectric control system and more particularly to such a system applied to the control of traveling cranes for the purpose of preventing collisions therebetween.

It is the object of the present invention to apply a photoelectric control arrangement upon cranes which will automatically prevent the collision between cranes without requiring the attention of the operators of the cranes who may be busily engaged in the manipulation thereof in the course of handling the work carried thereby.

It is a further object of the invention to provide a photoelectric control system for traveling cranes which is normally operative to prevent collisions and which may be disabled at the will of the operator in order to permit close contact between adjacent cranes should such be desirable or essential; for example, in the instances when one crane is pushing another.

It is a further object of the invention to provide a photoelectric control arrangement on cranes which is automatically operative to prevent the travel of the cranes beyond a predetermined point, for example in the proximity of a wall or the like.

It is an object of the invention to provide a rugged photoelectric relay system on traveling cranes for the purpose of stopping the travel of two approaching cranes toward each other before they collide, by breaking the control circuit of the motor drive of the cranes in their direction of approach, thereby to stop the motors and set the brakes which may be employed. This relay control is such that the same may be applied easily to existing crane structures and motor control circuits. The control system in accordance with the present invention is characterized by low maintenance costs and requires minimum attention.

The aims of the present invention are realized primarily by the provision of a source of light and a photoelectric cell on each crane together with opaque light intercepting members on each crane, the respective members projecting from each crane toward the other so that each may intercept the beam of light passing from the light source to the photoelectric cell on the other crane whenever one of the cranes approaches too close to the other. Upon the occurrence of this contingency, the control circuits of the driving motors of the cranes are modified automatically to deenergize the motors and to apply the brakes.

Other objects and purposes will appear from the detailed description of the illustrative embodiments of the invention following hereinafter, taken in conjunction with the accompanying drawings, wherein.

In all the figures similar reference characters are used to denote like parts.

Figure 1:
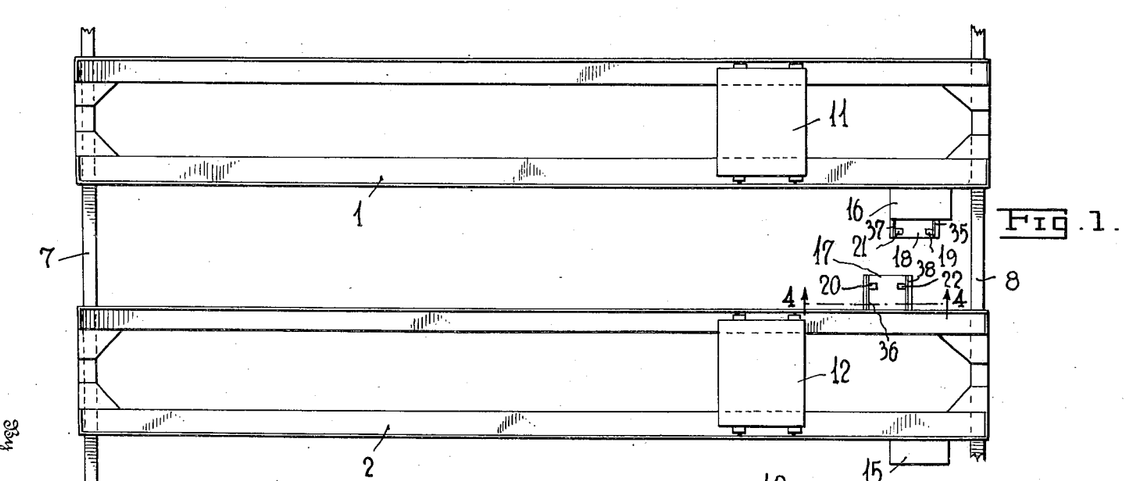
Figure 1 is a plan view of two cranes equipped with the photoelectric control means in accordance with the present invention.
Figure 2:
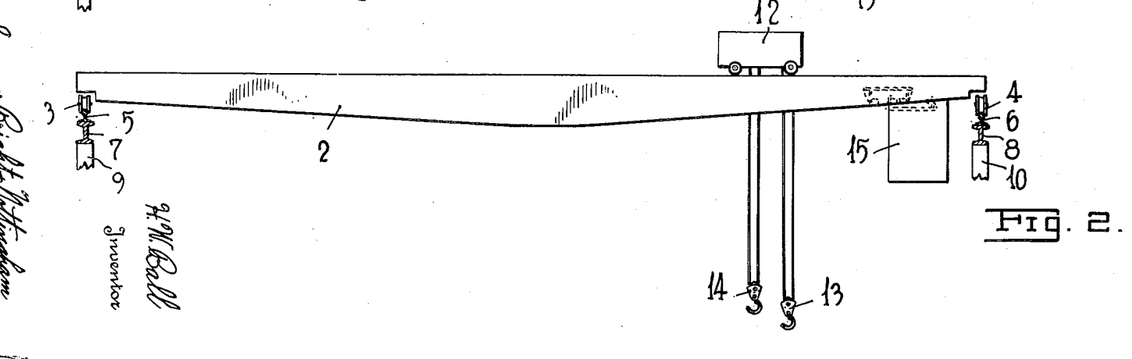
Fig. 2 is a front elevation of the structure shown in Fig. 1.
Figure 3:
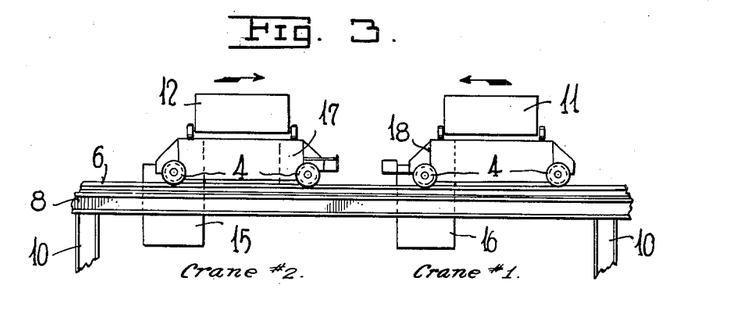
Fig. 3 is a right end elevation of the structure shown in Fig. 1.

Referring first to Figs. 1, 2, and 3, it will be seen that two cranes are here illustrated, designated by reference characters 1 and 2 respectively, although it will be understood that any number of cranes may be used in actual practice. The cranes 1 and 2 are mounted on the rails 5 and 6 by means of the wheels 3 and 4 running thereon, the rails themselves being supported by the I-beams 7 and 8, resting upon supports 9 and 10 for example.

The crane 1 has a traveling carriage 11 which moves across the building, that is, between the I-beams 7 and 8 and is provided with the customary pulley and hook 13, while a similar carriage 12 is mounted on crane 2 and carries the corresponding pulley and hook 14.

Crane 1 has the operator's cab 16 connected therewith while crane 2 has a similar operator's cab 15. Crane 1 carries the photoelectric device indicated generally by reference character 18, while crane 2 has the similar photoelectric device designated by reference character 17, these being arranged on the sides of the two cranes which face each other, that is, the photoelectric devices are disposed between the two cranes.

Figure 4:
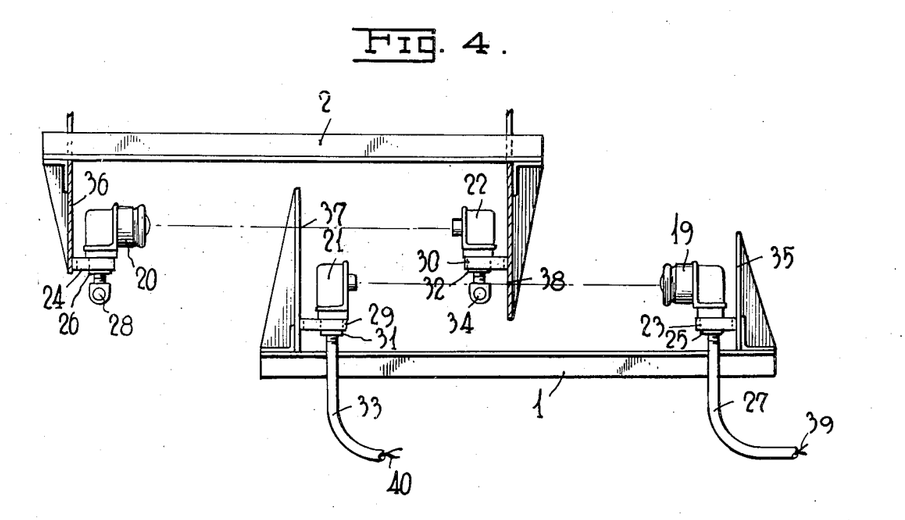
Fig. 4 is a vertical sectional view along line 4—4 of Fig. 1, showing a portion of the right hand end of each of the cranes together with the photoelectric device and the illuminating equipment carried by each of the cranes.

The photoelectric devices and their mechanical arrangement are illustrated in detail in Fig. 4. It may be seen that the crane 1 carries a photoelectric cell mounted in a housing 19 supported on a bracket 35 attached to the crane. A lug 23 is secured to the bracket 35 and a nut 25 cooperating with the screw-threaded end of the electrical conduit 27 may serve to secure the housing 19 to the shelf or lug 23. The conduit 27 serves to house and protect the conductors 39 which lead to the photoelectric cell mounted in the said housing 19.

A suitable light source is mounted in the housing 21 which is so arranged and positioned that the beam of light emanating therefrom will strike the photoelectric cell in the housing 19 when there is no opaque obstruction between the light source and the photoelectric cell. The casing 21 is mounted on a lug 29 secured to a bracket or flag 37 attached to the crane 1, and this may conveniently be accomplished by making use of the threaded end of the conduit 33 in cooperation with the nut 31. The conduit 33 serves to house and protect the conductors 40 which supply electricity to energize the source of light contained in the housing 21.

The nuts 25 and 31 may also serve to permit adjustment of the casings 19 and 21 so as to assist in properly aligning the beam of light and the photoelectric cell.

Exactly similar equipment is carried by the crane 2 wherein 20 indicates the housing of the photoelectric cell, 36 the bracket attached to the crane, 24 the lug carried by said bracket, 26 the nut, and 28 the conduit for the leads from the photoelectric cell, while 38 is the bracket having the arm or lug 30 secured thereto and carrying the lamp casing 22 by means of the nut 32 on the threaded end of the conduit 34 which houses the wires supplying electricity to the light source in casing 22.

Figure 5:
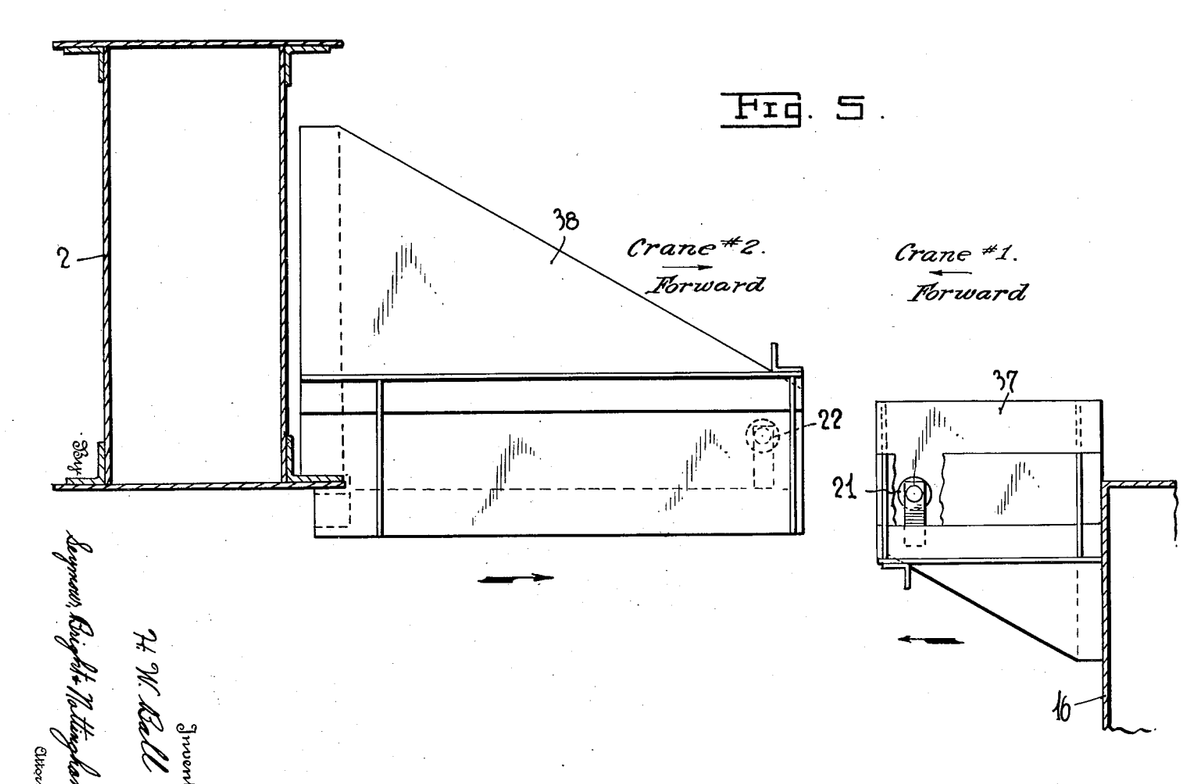
Fig. 5 is an enlarged view of a portion of Fig. 3 with certain parts in section, showing the relative positions of the photoelectric devices carried by the cranes.

Fig. 5 shows the interrelation of the two cranes more clearly. Here the crane 1 which carries the photoelectric device 19 is provided with a light intercepting member or flag 37 projecting substantially at right angles to the crane and in proper position to intercept the light beam coming from the source of illumination 22 which is carried by the other crane contiguous to the cab 16 of crane 1. When the crane 1 moves to the left from the position shown in Figure 5 to a sufficient extent, the flag 37 will pass in front of the light source 22 carried by the other crane, and between it and the photoelectric cell in the casing 20 so that the flag will thus cut off the light which would otherwise energize the photoelectric cell. As is clear from Fig. 5 this action occurs sometime before the two cranes collide, because the light intercepting bracket 37 projects outwardly from the crane. It will of course be understood, that each crane carries a light intercepting member to intercept the light beam of the photoelectric cell carried by the other crane, as shown at 37 and 38, and the effect of member 38 of crane 2 on the photoelectric relay system 19 and 21 of crane 1 is the same as explained above.

The energizing circuits for the photoelectric relay systems may be of the conventional types commonly known in different industrial fields and are explained in detail below for arrangements utilizing either alternating current or direct current.

Figure 6:
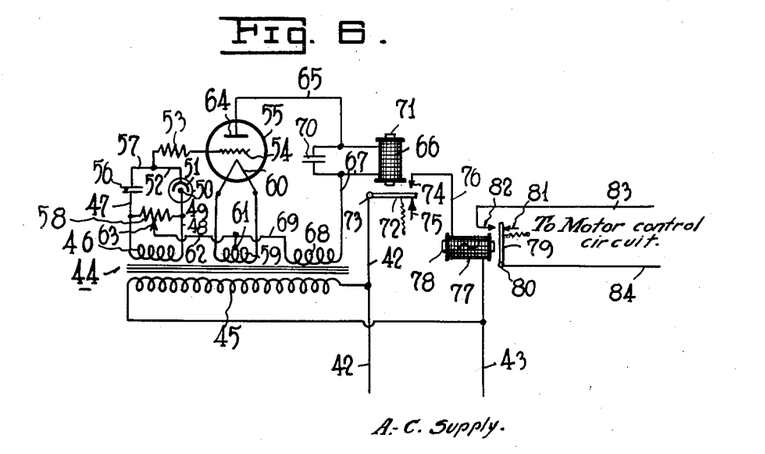
Fig. 6 is a circuit diagram of the photoelectric relay circuit utilizing alternating current for its energization.

The electrical connections of the photoelectric device are of two general types, depending on the nature of the current which actuates the motors of the cranes. In some installations alternating current is employed for this purpose. The electrical connections for alternating current actuation of the photoelectric device are shown in Fig. 6.

The alternating current is supplied through the leads 42 and 43, a transformer 44 with its primary winding 45 connected to said supply leads being provided. These supply leads are connected to the conductors $a$ and $b$ shown in the control circuit of Fig. 8. The transformer has a secondary winding 46 which is connected through the lead 48 to the anode 49 of a photoelectric cell 50, the cathode 51 of which is connected through conductor 52 and resistance 53 to the control grid 54 of a thermionic tube 55. The other end of the secondary winding 46 is connected by lead 47 through a suitable condenser 56 and a conductor 57 to the resistance 53, as shown. A voltage-dividing resistor 58 is also connected across the leads 47 and 48.

Another secondary winding 59 is used to supply energy to heat the cathode 60 of the thermionic tube 55 and this secondary winding has a tap 61 at its electrical center point, connected through a conductor 62 to a suitable adjustable point 63 of the voltage-dividing resistor 58 so as to vary the potential existing between the cathode 60 and the grid 54 of the amplifying thermionic tube 55.

The anode 64 of the thermionic tube 55 is connected through conductor 65, relay winding 66 and conductor 67 to one terminal of another secondary winding 68, the remaining terminal of which is connected through conductor 69 to the mid-point 61 of the secondary winding 59 already mentioned. A suitable condenser 70 is connected in parallel with the relay winding 66 as shown to smooth out the pulsations in the output circuit and to render uniform the operative effect of relay 66. The relay winding 66 has a core of magnetic material 71 which cooperates with the armature 72, pivoted at 73, and connected to the input lead 42 of the alternating current supply.

The sensitive relay comprising the winding 66, core 71, and armature 72 has a contact 74 cooperating with the armature so as to make electrical connection therewith when the armature 72 is attracted upward from the stop 75, upon sufficient energization of the winding 66. Thereupon a circuit is established from the input lead 42, through armature 72, contact 74, conductor 76, winding 77 and input lead 43 to the other side of the alternating current circuit whereupon the alternating current relay comprising the winding 77, core 78 and armature 79, pivoted at 80, will cause the said armature 79 to leave its stop 81 and establish connection with the contact member 82 whereby the said relay will thus provide electrical connection between the conductors 83 and 84 which lead to the motor control circuit, designated by conductors $c$ and $d$, in Fig. 8.

It will be clear that although alternating current is supplied to the photoelectric cell and to the amplifying triode, yet due to the rectifying properties of these devices the resultant output currents are pulsating direct currents and, therefore, the winding 66 is traversed by unidirectional current and not by alternating current, whereas the power relay 77 is fed directly from the input mains 42 and 43, and, therefore, carries alternating current.

Figure 7:
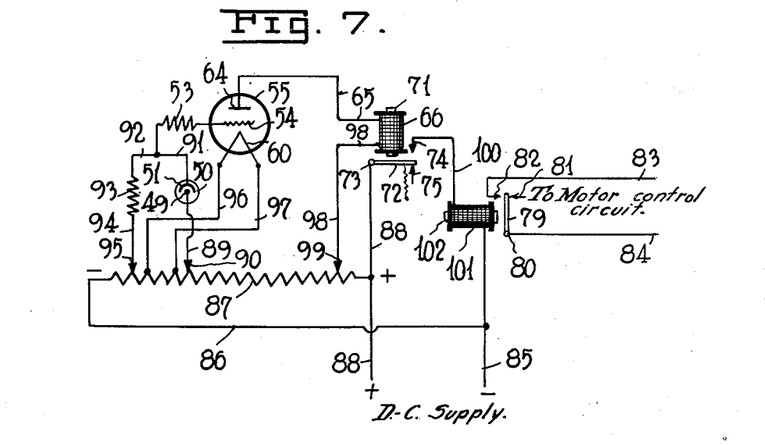
Fig. 7 is a circuit diagram similar to Fig. 6 utilizing direct current for the energization of the photoelectric relay circuit.

In certain plants direct current is used to operate the cranes and for such installations it is, of course, impossible to use transformers. Fig. 7 shows photoelectric cell connections that may be used for direct current operation when alternating current is not available. Starting from the negative input lead 85, the current here flows through conductor 86 to the negative terminal of a voltage dividing resistor 87 the positive terminal of which is connected to the positive lead 88 of the current supply. Leads 88 and 85 are connected to conductors $a$ and $b$, respectively, in the circuit shown in Fig. 9.

The photoelectric cell 50 has its anode 49 connected through the conductor 89 to a suitable variable point on the voltage-dividing resistor 87, so that the proper voltage may be applied to the anode 49. The cathode 51 of the photoelectric cell 50 is connected through conductor 91, conductor 92, resistor 93, and conductor 94 to a suitable variable contact point 95 making electrical connection with the resistor 87.

The control grid 54 of the amplifying thermionic tube 55 is connected through the resistor 53 to the junction point of conductors 91 and 92, as shown. The cathode 60 of the triode 55 may be connected through conductors 96 and 97 to suitable taps on the resistor 87. In general, these taps may be permanently fixed on the resistor 87 since the necessary variation of the grid potential is obtainable by shifting the contacts 90 and 95 suitable along the resistor 87.

The anode current for the triode is supplied to the anode 64 through the conductor 65, relay winding 66, and conductor 98 which terminates in the variable contact 99 shiftable along the resistor 87. Upon sufficient energization of the winding 66, the core 71 will become magnetized by the anode current of the thermionic tube 55, and will attract the armature 72, pivoted at 73, so that said armature will leave the stop 75 and establish electrical connection with the contact 74, thus causing current to flow from the D. C. lead 88 through armature 72, contact 74, conductor 100, relay winding 101 and conductor 85, which is the other D. C. lead.

Figure 9:
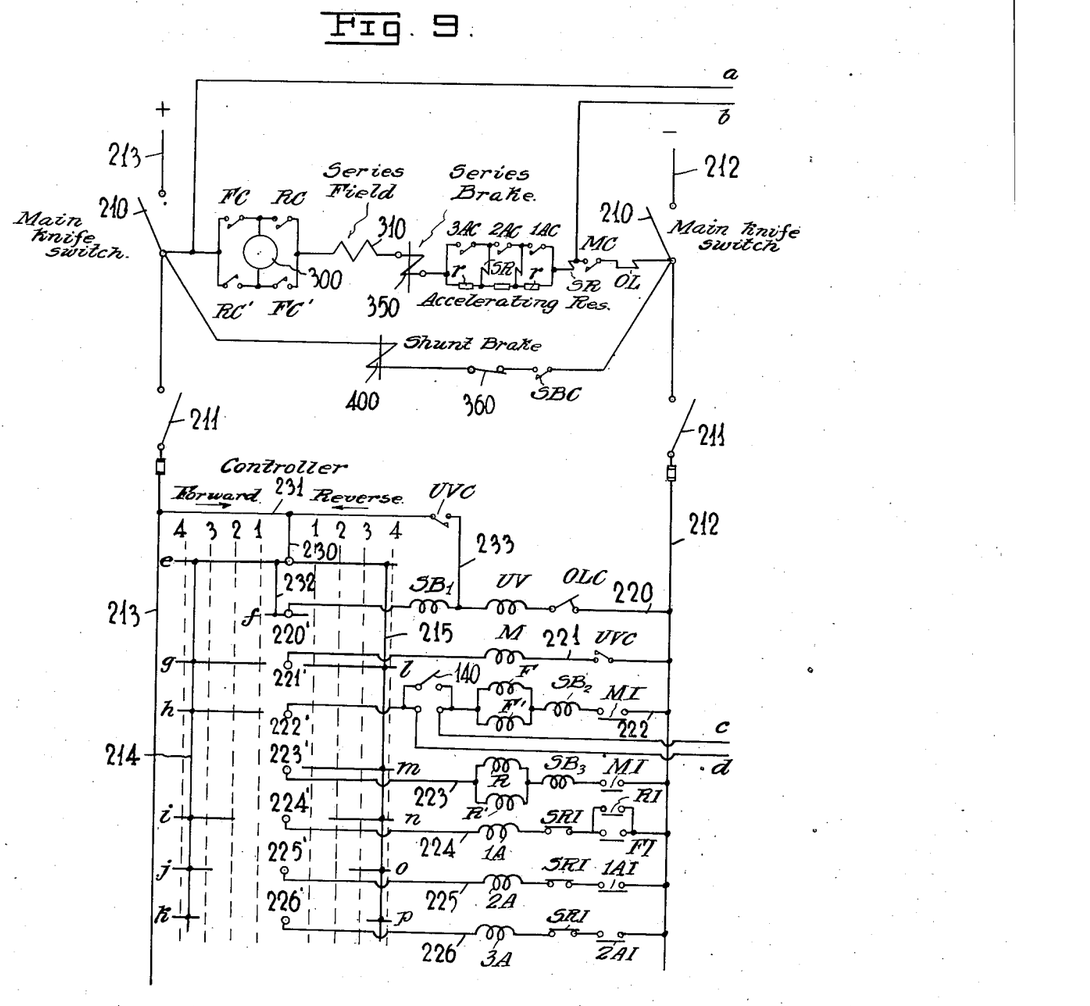
Fig. 9 is a schematic diagram illustrating the control for a direct current motor which incorporates the control exercised by the photoelectric relay circuit.

The current thus established in the winding 101 will magnetize the core 102, causing the core to attract the armature 79 so that it will move about its pivot 80, leaving the stop 81, and contacting with the contact 82, thus closing the motor control circuit connected to the leads 83 and 84, by conductors $c$ and $d$ in Fig. 9.

Figure 8:
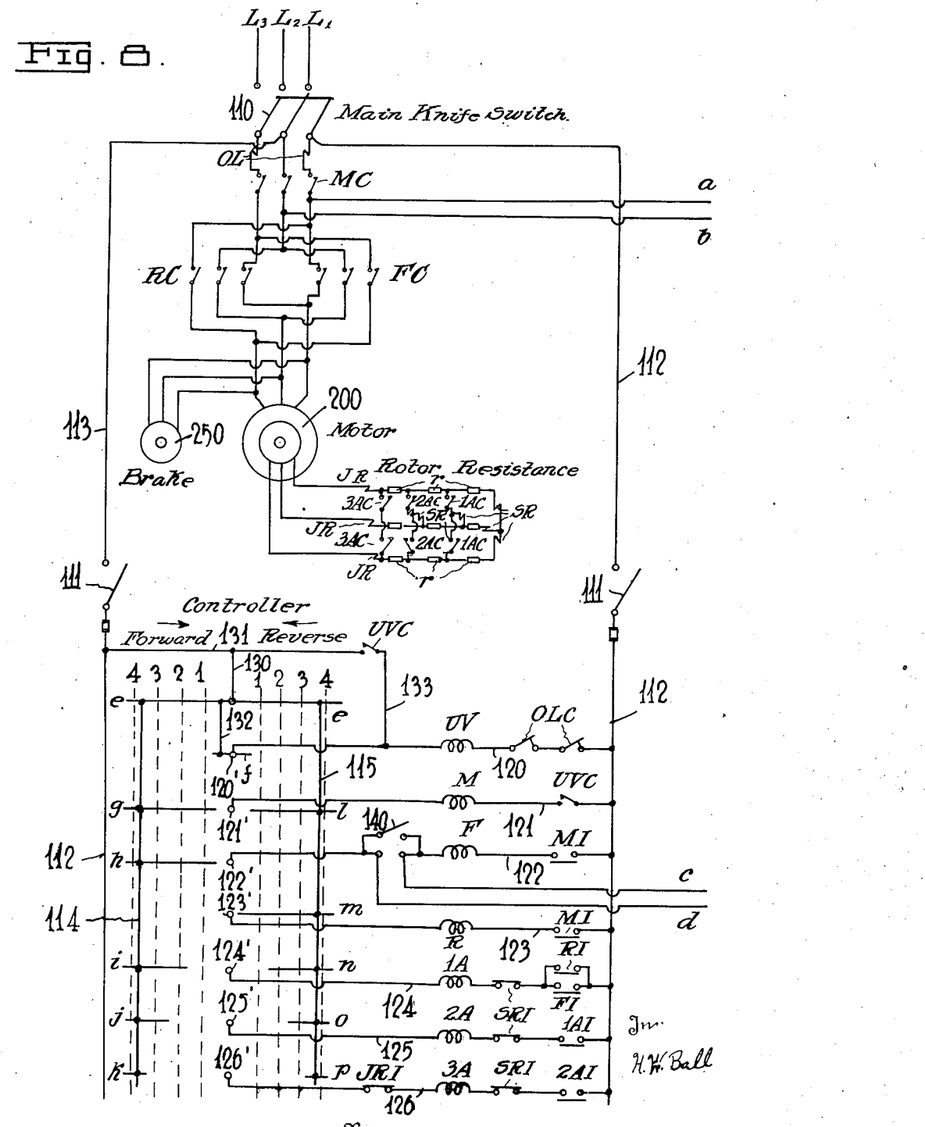
Fig. 8 is a schematic diagram illustrating the control circuit for an alternating current motor which incorporates the control exercised by the photoelectric relay circuit.

Figs. 8 and 9 are schematic diagrams showing control arrangements for an alternating current motor and a direct current motor, respectively, in which are inserted the conductors $c$ and $d$ leading from the photoelectric relay circuit which is normally closed but which is adapted to be interrupted upon the breaking of the light ray extending from the respective light sources to the photoelectric cells. In the explanation of circuits it is presumed that the forward movement of the controller gives rise to the forward direction of the cranes indicated generally by the arrows in Fig. 5, and that a reverse movement imparts rotation to the driving motor to actuate the cranes in a reverse direction.

In Fig. 8 is shown an alternating current induction motor 200 adapted to be energized from a 3-phase alternating current line $L_1$, $L_2$, $L_3$, with an operating brake 250 connected in the input side of the motor. The main knife switch 110 and the control switches 111 are closed for the purpose of starting the motor. The switches 111 serve to connect the mains 112 and 113 across $L_1$, $L_2$ of the main power supply. With the controller in the off position, the under-voltage relay UV is energized across mains 112 and 113 by way of the over-load contactors OL in line 120, terminal stud 120', conductive segment $f$, conductors 132, 130 and 131. The energization of the relay UV closes the contactor UVC in conductor 133 as well as in line 121 to provide a holding circuit for this relay and to condition the main contactor for energization in the line 121.

The forward movement of the controller to its first position 1 brings the conductive segments $g$ and $h$ into contact with the terminal studs 121', 122'. The first segment completes the circuit of the main contactor relay M in line 121 across the control mains 112 and 113 to energize this relay and to close the main contactor MC at the upper end of the figure as well as its interlock MI in line 122. The closing of the main contactor MC completes a connection of the lines $L_1$ and $L_2$ to conductors $a$, $b$ which lead to the A. C. supply conductors 42 and 43 for energizing the photoelectric relay circuit. Thus this circuit is energized only when the main contactor is closed, which results in a longer life of the photoelectric relay, since the same is in operation only when the operator is running the crane motor. If the cranes are in such position that no collision is imminent, whereupon the circuit extending from conductors 83 and 84, Fig. 6, to conductor $c$, $d$ in Fig. 8 is closed, the closing of the main contactor interlock MI in line 122 completes the circuit of the forward contactor relay F across control mains 112 and 113 by the contact of terminal stud 122' with segment $h$, which in turn is connected with conductors 130 and 131 at the upper end of the controller through common conductor 114. The closing of the forward contactor FC completes the connection of the power mains to the stator of the induction motor 200 and the motor is in condition to propel the crane in the direction shown in Fig. 5. The speed of the motor is stepped up by manipulating the controller successively to the positions 2, 3 and 4, which in turn brings the conductive segments, $i$, $j$ and $k$ into contact with terminal studs 124', 125' and 126' respectively. The energization of the forward contactor relay F in line 122 effects a closing of the FI interlock in line 124 which conditions the energization of the accelerating contactor relay 1A in line 124, when conductive segment $i$ makes contact with terminal stud 124'. The closing of the accelerating contactors 1AC in the rotor circuit of the induction motor serves to cut out some of the resistors $r$ therein, resulting in an increase of speed of the motor. Upon the closing of the interlock 1AI in line 125, the circuit for the energization of the accelerating contactor relay 2A is conditioned, and is completed when the controller is moved to its third position to contact the conductive segment $j$ with terminal stud 125'. The energization of the accelerating contactor relay 2A cuts out additional resistance from the rotor circuit by the closing of the accelerating contactors 2AC therein. The closing of the corresponding interlock 2AI in line 126 conditions the accelerating contactor relay 3A for energization when the conductive segment $k$ comes into contact with terminal stud 126'. The energization of the accelerating contactor relay 3A serves to close the accelerating contactors 3AC in the rotor circuit to cut out the last of the rotor resistance, resulting in the highest speed of operation of the motor.

Series relays SR and jam relays JR are disposed in the several phases of the secondary circuit of the motor against harmful overloads, which in the case of energization break the normally closed interlocks SRI and JRI in lines 124, 125 and 126 to reintroduce the resistors $r$ into the secondary circuit. In addition, overload relays OL are inserted in lines $L_1$ and $L_3$ between the main knife switch and the main contactor to break the motor circuit upon the occurrence of overloads.

Upon the occurrence of a dangerous condition which will evidence itself by the interruption of the light ray extending between the light source and the photoelectric cell, the normally closed circuit extending between conductors 83 and 84 (Fig. 6) and $c, d$, (Fig. 8) will be broken, whereby the circuit in line 122 energizing the forward contactor relay F is broken at the terminals connecting conductors $c, d$ therein. The deenergization of this relay operates to open the forward contactor FC to disable the motor and to trip the brake 250 for operation. The breaking of the forward contactor operates to open the circuit of lines 124, 125 and 126 by virtue of the opening of the forward contactor interlock FI in line 124, and the interlocks 1AI and 2AI in lines 125 and 126. The operator must then reverse the motor to withdraw the crane from its dangerous position and the controller is backed off from its forward position to a reverse position which momentarily disables the main contactor relay M when the segment $g$ is brought out of contact with the terminal stud 121' but which is immediately reenergized when the conductive segment $l$ is brought into contact therewith in the first position of the reverse movement of the controller. The first position of the controller in the reverse position 1 completes a circuit of the line 123 between the control mains 112 and 113 which includes the main contactor interlock MI, reverse contactor relay R, terminal stud 123', conductive segment $m$, conductors 115, segment $e$, conductors 130 and 131. The energization of the reverse relay R operates to close the normally open reverse contactor RC between the power line brake and motor, which serves to connect the three lines $L_1$, $L_2$ and $L_3$ to the stator of the motor 200 with one of the phases reversed with respect to that when the forward contactor FC is closed. This results in a reverse rotation of the motor and the opening of the brake and a withdrawal of the crane from its dangerous condition, which movement of the crane can be controlled by varying the speed of the motor as explained above in connection with the forward movement thereof by the consecutive movement of the controller to positions 2, 3 and 4 in the reverse direction, whereupon accelerating relays 1A, 2A and 3A are successively energized to close the accelerating contactors as explained above. The control of the rotor resistance is executed alternatively by the alternate operation of the forward interlock FI or the reverse interlock RI disposed in parallel in line 124.

Of course, the motor and crane are in condition for forward operation at any time after the photoelectric relay circuit is closed at conductors $c, d$. In the event that the control normally exercised by the photoelectric relay is desired to be eliminated, for example upon such occasions as require a close contact of the two cranes in the course of the handling of work by the combined cranes, or when one pushes the other, a switch 140 is inserted in line 122 to bridge the open circuit of the conductors $c, d$ whereupon the crane can be manipulated in a forward direction by the manual or pedal actuation of switch 140 by the operator.

In Fig. 9 is shown a direct current motor comprising an armature 300 and a series field 310 designed to be energized from the direct current mains 212, 213 across which the motor is connected. The closing of the main knife switch 210 and the control circuit knife switch 211 prepares the circuit for operation in the manner explained below. Fig. 9 shows a shunt brake 400 connected between the mains 212 and 213 immediately behind the knife switch 210 which is generally used for an electric brake on a bridge drive of cranes. A series brake coil 350 may be used as an alternative to a shunt brake coil, the operation of which will be explained in detail below.

The closing of switches 210 and 211 with the controller in the "off" or neutral position, completes the circuit from power mains 212 and 213 through line 220 containing the normally closed overload contactor OLC, undervoltage relay UV and shunt brake relay $SB_1$. The circuit is completed by the terminal stud 220' making contact with the conductive segment $f$ leading through conductors 232, 230 and 231 to main 213. The energization of undervoltage relay UV effects a closing of the undervoltage contactor UVC in conductor 233 and in the line 221 to provide a holding circuit for this relay and to condition the main relay M for energization when the controller is moved to the first position in either its forward or reverse direction. The relay $SB_1$ maintains the shunt brake contactor SBC closed to energize the holding coil 400 for the brake. To operate the crane in a forward direction, the controller is moved to the first forward position 1. The main relay M is energized across mains 212 and 213 by contact of the terminal stud 221' with conductive segment $g$, conductors 214, 230 and 231 connected with the main 213. The closing of the main contactor MC in the motor circuit at the upper end of Fig. 9 furnishes an energizing source to conductors $a$ and $b$ which are connected with conductors 88 and 85, respectively, in Fig. 7. Thereby the photoelectric relay circuit is energized only at the times that the motor is being operated.

The energization of the main contactor MC effects a closing of the MI interlock in line 222 which completes the circuit of line 222 through stud terminal 222' and conductive segment $h$ to line 213 if the photoelectric relay circuit terminating in conductor $c, d$ is closed. Thereby the forward contactor relays F and F' are energized to close the respective forward contactors FC and FC' in the upper part of Fig. 9 to complete the motor circuit to the armature and series field and a plurality of starting resistances $r$ in series.

Although the shunt brake relay $SB_1$ is no longer energized, the shunt brake relay $SB_2$ is energized when the circuit of line 222 is completed, thereby maintaining the brake coil operative as long as the forward relay circuit remains closed.

The motor may be accelerated in its movement in the forward direction by shifting the controller to positions 2, 3 and 4, whereby conductive segments *i*, *j*, and *k* make successive contact with terminal studs 224', 225' and 226' to complete successively the circuits of lines 224, 225 and 226, extending between mains 212 and 213. Thereupon the accelerating contactor relay IA is energized to close its corresponding contactor IAC to cut out a portion of the starting resistance, accelerating contactor relay 2A is energized to cut out another portion of the starting resistance by virture of the closing of its contactor 2AC, and accelerating contactor relay 3A is designed to be energized and close the contactor 3AC to cut out the last portion of the resistance to attain maximum speed in a forward direction.

When the light beam of the photoelectric relay is intercepted, circuit *c, d* is broken, whereupon the circuit extending through line 222 is interrupted, which deenergizes the forward contactor relays F and F' to open the corresponding contactors FC and FC', breaking the energizing potential on the motor. Without the energization of the forward contactor relays, lines 224, 225 and 226 are deenergized by the opening of the interlocks FI and IAI and 2AI. At the same time the shunt brake energizing coil SB2 is deenergized to open the shunt brake contactor SBC to release the magnetic holding coil and to apply the brake to the motor.

A reverse movement of the controller will shift the field of operation to the other side thereof, whereupon the main contactor relay is momentarily deenergized as contact with terminal stud 221' shifts from conductive segment *g* to conductive segment *l*, wherefrom the circuit is completed through conductors 215, 230 and 231 to the main 213. In the first position of the controller terminal stud 223' makes contact with conductive segment *m* which completes the circuit of line 223 containing the reverse contactor relays R and R' which effect a closing of the reverse contactors RC and RC', respectively, to apply the potential on the armature in a reverse polarity from that when the contactors FC and FC' are operated. Also, the shunt brake coil SB3 is energized to close the shunt brake contactor SBC which maintains the brake inoperative until the circuit of line 223 is interrupted. Thus it is seen that the shunt brake contactor is maintained closed in the off position of the controller by coil SB1, in the forward position of the controller by SB2, and in the reverse position of the controller by coil SB3. In addition, a normally closed switch 360 is connected in the shunt brake circuit in order to open the circuit as needed.

In the case that a series brake coil 359 is used instead of a shunt brake coil, the shunt brake contactor relays SB1, SB2, and SB3 would not be included in the control circuit, since the series brake is set when the forward contactors FC and FC' are opened.

The foregoing wiring arrangements are merely illustrative of control systems in which the present invention may find application, and the invention may be adapted to all tyes of crane control circuits.

It is within the comprehension of the invention to provide photoelectric control relays upon both ends of the cranes and to insert the control therefrom into the reverse motor controlling circuit in the same manner as the same has been inserted in the forward controlling circuit. Furthermore, a light intercepting member may be disposed at any point in the field of operation of the crane to act as a limit stop control therefor, for example, at the end of a building. However, my invention finds its maximum utility for the prevention of collisions between adjacent cranes.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. Means for controlling the operation of a plurality of motor-operated traveling devices which have at least a portion of their paths in common, said means comprising a photoelectric relay with contacts which are closed when the relay is energized, a source of light and a light-intercepting member carried by each traveling device, together with power supply means for the same, the member of each traveling device being arranged to be capable of intercepting the light beam of the other traveling device, an operating circuit for each traveling device, means in said circuit controlled by the photoelectric relay contacts to prevent such operation when the light beam is interrupted, and an auxiliary switch connected across the contacts for permitting operation of the traveling device even when the photoelectric relay contacts are open.

2. Means for preventing collision between two motor-operated traveling cranes which run on the same track, said means comprising a photoelectric relay, a source of light and a light-intercepting member carried by each crane, power supply means for the relay and light, the member of each crane being so positioned on its crane as to be capable of intercepting the light beam of the other crane when the cranes approach too closely to one another, an operating circuit for the motor of each crane, and means in said circuit controlled by the photoelectric relay for disabling and arresting the operation of the motor when the light beam is interrupted by the light-intercepting member of the other crane.

3. Means for preventing collision between two motor-operated traveling cranes which have at least a portion of their paths in common, said means comprising units each consisting of a photoelectric cell, means for projecting a beam of light thereon, power supply means therefor, and a light-intercepting member, one such unit being carried by each traveling crane, the member of each crane being arranged to be capable of intercepting the light beam of the unit carried by the other traveling crane, an operating circuit for the motor of each traveling crane, means in said circuit controlled by the corresponding photoelectric unit for disabling said operation when the corresponding light beam is interrupted, and means for controlling the motor for rotation in the opposite direction.

4. Means for controlling the operation of two motor-operated traveling cranes which run on a common track, said means comprising a photoelectric relay consisting of a photoelectric device, a source of light for projecting a beam of light thereon, and an electromagnetic relay operated thereby, a light-intercepting member carried by each traveling crane, and power supply means for the said photoelectric relay, the member of each crane being arranged to be capable of intercepting the light beam of the other traveling crane, an operating circuit for the motor of each traveling crane, means in said circuit for the motor of each traveling crane, means in said circuit for controlling the direction of rotation of the motor, and means controlled by the said electromagnetic relay to prevent the further operation of the motor in one direction when the light beam is interrupted.

5. Means for controlling the operation of two motor-operated traveling cranes which run on the same track, said means comprising a photoelectric relay with contacts which are closed when the relay is energized, a source of light and a light-intercepting member carried by each traveling crane, together with power supply means for the same, the member of each crane being arranged to be capable of intercepting the light beam of the other traveling crane, an operating circuit for each traveling crane, means in said circuit controlled by the photoelectric relay contacts for disabling said operation when the light beam is interrupted, a brake for the crane, and means controlled by the relay contacts for actuating said brake.

6. Means for controlling the operation of two motor-operated traveling cranes which run on a common track, said means comprising a photoelectric relay consisting of a photoelectric device, a source of light for projecting a beam of light thereon, and an electromagnetic relay operated thereby, a light-intercepting flag carried by each traveling crane, and power supply means for the said photoelectric relay, the flag of each crane being arranged to be capable of intercepting the light beam of the other traveling crane, an operating circuit for the motor of each traveling crane, means in said circuit for controlling the direction of rotation of the motor, means controlled by the said electromagnetic relay to prevent operation of the motor in one direction when the light beam is interrupted, operator-controlled means for rendering said relay ineffective at will, and means for controlling the motor for rotation in the opposite direction.

HARVEY W. BALL.